(No Model.)
E. A. SPERRY.
COUPLING DEVICE.
No. 565,935.    Patented Aug. 18, 1896.
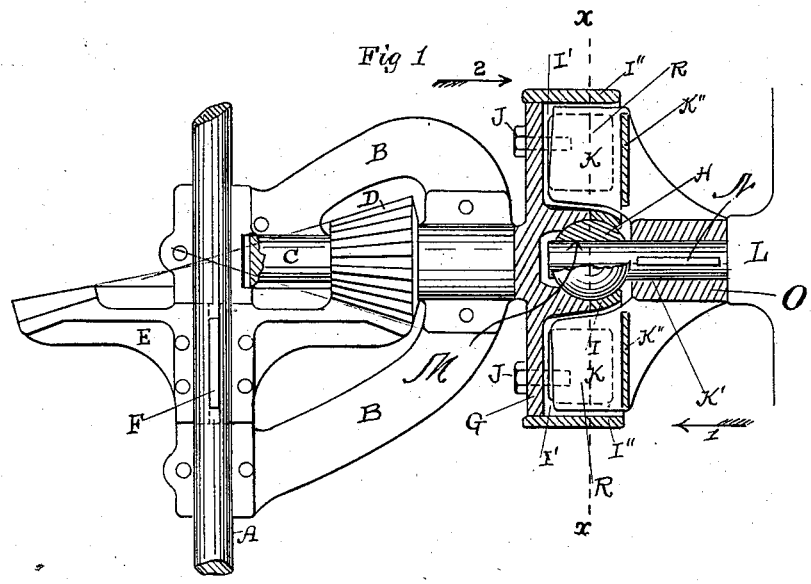
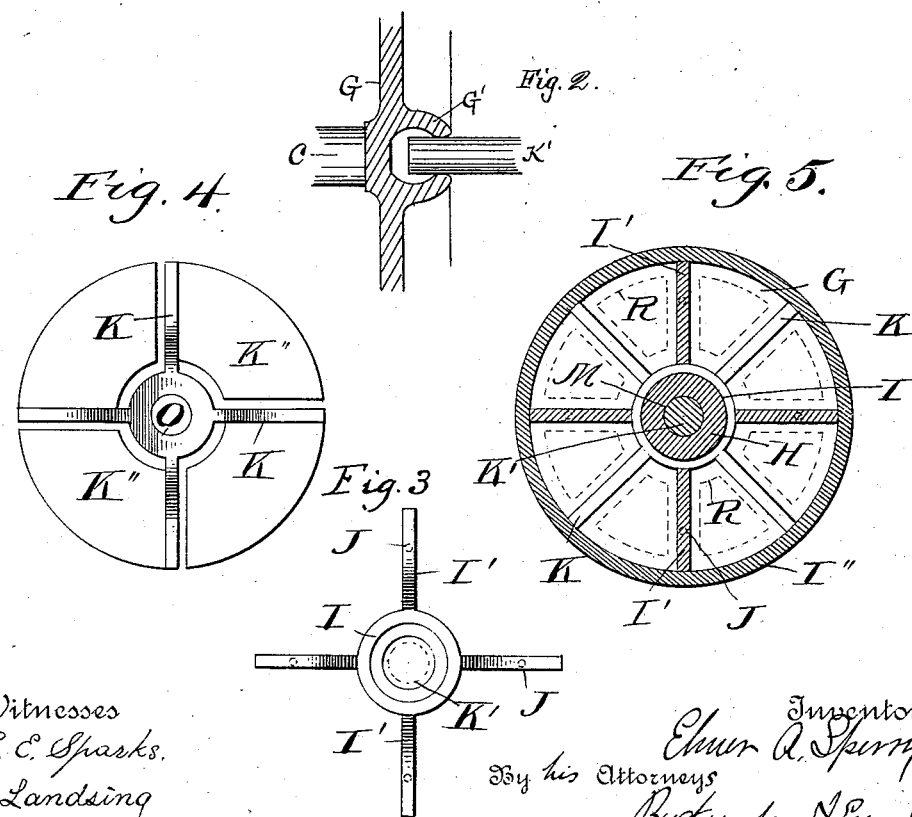

UNITED STATES PATENT OFFICE.

ELMER A. SPERRY, OF CLEVELAND, OHIO, ASSIGNOR TO THE GENERAL ELECTRIC COMPANY, OF NEW YORK.

COUPLING DEVICE.

SPECIFICATION forming part of Letters Patent No. 565,935, dated August 18, 1896.

Application filed January 28, 1893. Serial No. 460,026. (No model.)

*To all whom it may concern:*

Be it known that I, ELMER A. SPERRY, a citizen of the United States, residing at Cleveland, in the county of Cuyahoga and State of Ohio, have invented a new and useful Improvement in Coupling Devices, of which the following is a specification.

My invention relates to a device for the transmission of power from one shaft or rotating part to another through the medium of a universal-joint coupling.

It has for its object the making of a cheap and durable coupling, and at the same time allowing the support of one of the rotating portions to be sustained by the other.

A further object is to prevent two coupled shafts to vary considerably in alinement without interfering with their rotation or the regular transmission of power from one to the other, as in the case of an electric motor flexibly mounted on a car-truck and geared to the axles, which are free to move vertically and axially in their bearings.

These objects are attained by mechanism illustrated in the accompanying drawings, in which—

Figure 1 is a plan view of my invention, partly in section. Fig. 2 is a modification. Fig. 3 is a face view of one member of the power-transmitting device. Fig. 4 is a face view of the other member of the power-transmitting device. Fig. 5 is a section on the line $x\ x$ of Fig. 1, looking in the direction of arrow 1.

In all of the above views corresponding parts are represented by the same letters of reference.

Upon the shaft or axle A is a swing-bracket B, having bearings journaled on the shaft. This bracket also carries another set of bearings, at right angles to the others, in which is journaled the driving-shaft C, said shaft carrying a pinion D, which meshes with a gear E, which is interposed between the two bearings of the swinging bracket B. This gear E has a feather-way in its central bore, which fits the key or spline F, which is mounted on the shaft A, thus permitting the gear-wheel E to move axially along the shaft A as the case may require.

Secured to the pinion-shaft or extending therefrom is one member of the power-transmitting device, consisting of two parts, one of which is the disk G, which is provided with a central cup-shaped or hemispherically-shaped socket, in which is placed a ball H. The second part of this member consists of a central annular body portion I, having its central opening conforming to the cup in the disk G, said portion I serving to hold the ball H securely in place when the parts are placed together. The ring I has arms I' radiating therefrom, which terminate at or close to a ring or hoop $I^2$, attached to or formed on the disk G. After placing the ball H in said socket the parts G I are secured together by screws or bolts J, passing through the disk G into the arms I', both combined forming one member of the power-transmitting device.

The ball H, which fits the hemispherical recess or socket in the above-mentioned member of the device, has extending centrally through it a passage M, through which passes loosely the driving-shaft K'. On one end of said shaft is a key or feather N, which locks said shaft to the second member of the power-transmitting device, consisting of a hub O, having extending therefrom radial webs or arms or wings K, which are so shaped as to fit freely over the socket containing the ball and which interlock with the radial arms I'. At the rearward part of each of these wings K is a flange or plate $K^2$, arranged at right angles to the plate K in a plane of rotation around the shaft K'. The wings K $K^2$, disk G, and wings I' thus form pockets surrounding the shaft K'. In these pockets or recesses are buffers or cushions, as shown by dotted lines R R, preferably made from elastic material, such as rubber.

The operation of my improved device is as follows: Upon rotating the shaft K' by any suitable power, such as a motor L, wings K impart motion to the arms I' through the interposed and elastic cushions, and thus cause the shaft C to rotate and drive the gear E and the shaft A. Since the bracket B is hinged on the shaft and is connected with the motor by the ball-and-socket joint, it follows that the parts have considerable freedom of movement to accommodate the varying relative positions of the shaft or axle A and the motor L. Inasmuch as the bracket is supported at one end solely by the ball-and-socket joint, it is free to move up or down with the motor L at all times. In place of a ball-and-socket joint the ball may be omitted and the mouth of the cup G may be constructed to fit closely around the shaft K', whose end enters the socket and has room therein to move sufficiently in every direction to allow for changes in alinement between the shafts K' and C, as shown in Fig. 2.

Having now described my invention, what I claim as new, and desire to secure by Letters Patent, is as follows:

1. In a power-transmitting device, the combination with a driving-shaft and a driven shaft, of a ball loosely mounted on one shaft, a disk secured to the other shaft and having a central cup-shaped socket receiving said ball, a ball-retaining device arms secured to the face of the disk, and arms secured to the driving-shaft, and interlocking with the arms secured to the disk, substantially as described.

2. In a power-transmitting device, the combination with a driving-shaft and a driven shaft, of a ball loosely mounted on one shaft, a disk secured to the other shaft, and having a central cup-shaped socket receiving said ball, a ring fitting over and securing said ball in the socket, radial arms on said ring secured to the disk, and arms on the driving-shaft interlocking with those secured to the disk, substantially as described.

3. In a power-transmitting device, the combination with a driving-shaft and a driven shaft, of a ball loosely mounted on one shaft, a disk secured to the other shaft and having a central socket to receive the ball, a ball-retaining device carrying radial arms, arms on the driving-shaft interlocking with those on the ball-retaining device, and elastic cushions between said arms, substantially as described.

4. In a power-transmitting device, the combination with a driving-shaft and a driven shaft, of a universal joint connecting the ends of said shafts, radial arms secured to one shaft and provided with flanges lying in a plane of rotation, a disk secured to the other shaft, radial arms secured to said disk, and interlocking with the arms on the driving-shaft, and rubber cushions in the pockets thus formed, substantially as described.

ELMER A. SPERRY.

Witnesses:
ALBERT H. BATES,
CHARLES J. LEEPHART.